United States Patent
Johns et al.

(10) Patent No.: US 11,882,854 B2
(45) Date of Patent: *Jan. 30, 2024

(54) EGG FOOD PRODUCT AND METHOD OF MAKING AN EGG FOOD PRODUCT

(71) Applicant: EGGLIFE FOODS, INC., Seymour, IN (US)

(72) Inventors: Peggy D. Johns, Monon, IN (US); Steve Amundson, Scottsdale, AZ (US)

(73) Assignee: EGGLIFE FOODS, INC., Seymour, IN (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/135,838

(22) Filed: Dec. 28, 2020

(65) Prior Publication Data

US 2021/0315242 A1 Oct. 14, 2021

Related U.S. Application Data

(63) Continuation of application No. 16/077,432, filed as application No. PCT/US2018/023434 on Mar. 20, 2018, now Pat. No. 10,874,128.

(Continued)

(51) Int. Cl.
*A23L 15/00* (2016.01)
*A23P 30/20* (2016.01)
(Continued)

(52) U.S. Cl.
CPC .............. *A23L 5/00* (2016.08); *A23P 30/20* (2016.08); *A23L 7/109* (2016.08); *A23V 2002/00* (2013.01)

(58) Field of Classification Search
CPC . A23V 2002/00; A23V 2300/16; A23L 15/00; A23L 7/109; A23P 30/20; A23P 30/10; A23P 30/00; A23P 10/00
See application file for complete search history.

(56) References Cited

U.S. PATENT DOCUMENTS

| 2,236,006 A | 3/1941 | Mulvany |
| 3,062,665 A | 11/1962 | Peebles et al. |

(Continued)

FOREIGN PATENT DOCUMENTS

| CN | 101243887 A | 8/2008 |
| CN | 101406300 A | 4/2009 |

(Continued)

OTHER PUBLICATIONS

"Egg White Power (spray-dried egg white)", MolecularRecipes. Com, (2016), available on the Internet at http://www.molecularrecipes. com/hydrocolloid-guide/egg-white-powder/; 4 pgs.

(Continued)

*Primary Examiner* — Hong T Yoo
(74) *Attorney, Agent, or Firm* — Faegre Drinker Biddle & Reath LLP (57) ABSTRACT

An egg food product and a method for making the same. In one embodiment the method of making a food product comprises feeding a liquid composition into a cavity, the liquid composition comprising at least 80% liquid egg comprising albumen and yolk; mixing the liquid composition in the cavity; raising the temperature of the mixed liquid composition to above 175° F.; and after raising the temperature, extruding the mixed liquid composition through a die cavity having a temperature greater than 175° F. to solidify and shape the mixed liquid composition into a solid composition; and cutting the solid composition to a desired length.

22 Claims, 9 Drawing Sheets

Related U.S. Application Data (60) Provisional application No. 62/554,598, filed on Sep. 6, 2017, provisional application No. 62/473,676, filed on Mar. 20, 2017.

(51) Int. Cl.
*A23L 5/00* (2016.01)
*A23L 7/109* (2016.01)

(56) References Cited

U.S. PATENT DOCUMENTS

| | | |
|---|---|---|
| 3,475,180 A | 10/1969 | Eynon |
| 3,679,338 A | 7/1972 | Utz |
| 3,711,299 A | 1/1973 | Ziegler |
| 3,843,811 A | 10/1974 | Seeley |
| 3,930,054 A | 12/1975 | Liot et al. |
| 4,068,570 A | 1/1978 | Lanoie |
| 4,138,507 A | 2/1979 | Iimura |
| 4,421,770 A | 12/1983 | Wiker et al. |
| 4,866,937 A | 9/1989 | Leigh-Monstevens |
| 4,957,760 A | 9/1990 | Swartzel et al. |
| 5,296,247 A | 3/1994 | Huang et al. |
| 5,427,016 A | 6/1995 | Dunckel |
| 5,932,276 A | 8/1999 | Bhatia et al. |
| 5,935,628 A | 8/1999 | Hauser et al. |
| 5,989,620 A | 11/1999 | Wang et al. |
| 6,004,503 A | 12/1999 | Neil |
| 6,004,603 A | 12/1999 | Vandepopuliere et al. |
| 6,764,705 B2 | 7/2004 | Shefet |
| 8,080,276 B2 | 12/2011 | Dybing |
| 8,273,394 B2 | 9/2012 | Watanabe et al. |
| 8,561,528 B2 | 10/2013 | Peters |
| 8,746,132 B2 | 6/2014 | Lawrence et al. |
| 2001/0009686 A1 | 7/2001 | Merkle et al. |
| 2003/0134023 A1 | 7/2003 | Anfinsen |
| 2003/0134030 A1 | 7/2003 | Merkle et al. |
| 2004/0043124 A1 | 3/2004 | Dybing |
| 2005/0013917 A1 | 1/2005 | O'Kelley et al. |
| 2007/0275127 A1 | 11/2007 | Ball et al. |
| 2008/0085359 A1 | 4/2008 | Merkle et al. |
| 2008/0254168 A1 | 10/2008 | Mueller et al. |
| 2008/0292763 A1 | 11/2008 | Looft et al. |
| 2008/0292769 A1 | 11/2008 | Tang et al. |
| 2014/0102317 A1 | 4/2014 | Shoshan |
| 2014/0271998 A1 | 9/2014 | Hecht |
| 2015/0017295 A1 | 1/2015 | Kuil et al. |
| 2015/0079247 A1 | 3/2015 | Merkle et al. |
| 2015/0314254 A1 | 11/2015 | Benassi et al. |
| 2016/0165943 A1 | 6/2016 | Yurgec et al. |
| 2019/0357576 A1 | 11/2019 | Johns et al. |

FOREIGN PATENT DOCUMENTS

| | | |
|---|---|---|
| CN | 103005504 A | 4/2013 |
| CN | 103005505 A | 4/2013 |
| CN | 103005555 A | 4/2013 |
| CN | 103298347 A | 9/2013 |
| EP | 2926674 A1 | 10/2015 |
| JP | 61-224968 | 10/1986 |
| JP | 61-289870 A | 12/1986 |
| JP | 2016-002000 A | 1/2016 |
| WO | 2008/073849 A2 | 6/2008 |
| WO | 2014/118265 A1 | 8/2014 |
| WO | 2016/077457 A1 | 5/2016 |

OTHER PUBLICATIONS

"Veggie and Egg White Breakfast Wrap", Paleoso, (2016), available on the Internet at https://paleoso.com/veggie-egg-white-breakfast-wrap/; 2 pgs.

Brown, Amy, Understanding Food Principles and Preparation, 4th Edition, 2011, p. 259 (Year: 2011).

Die definition, https://www.merriam-webster.com/dictionary/die, bullet point 3c. (Year: 2020).

Extended European Search Report for European Application No. 18771097.5, dated Jul. 22, 2020, 10 pages.

International Preliminary Report on Patentability received for PCT Patent Application No. PCT/US2018/023434, dated Oct. 3, 2019, 13 pages.

International Search Report and Written Opinion issued by the ISA/US, Commissioner for Patents, dated Jun. 15, 2018, for International Application No. PCT/US2018/023434; 14 pages.

EGG FOOD PRODUCT AND METHOD OF MAKING AN EGG FOOD PRODUCT

CROSS-REFERENCE TO RELATED APPLICATIONS

The present application is a continuation of U.S. patent application Ser. No. 16/077,432, filed on Aug. 10, 2018, which issued as U.S. Pat. No. 10,874,128 on Dec. 29, 2020, and which is a national phase filing under 35 U.S.C. § 371 of International Application No. PCT/US2018/023434, titled "Egg Food Product and Method of Making An Egg Food Product," filed on Mar. 20, 2018, which claims priority to U.S. Provisional Patent Application No. 62/473,676, filed Mar. 20, 2017, and U.S. Provisional Patent Application No. 62/554,598, filed Sep. 6, 2017; the foregoing applications are incorporated by reference herein in their entirety.

TECHNICAL FIELD

The present disclosure relates generally to an egg food product, and, more particularly, to a method of making an egg food product.

BACKGROUND OF DISCLOSURE

A need continuously exists for food alternatives that are healthy, gluten-free, low-carbohydrate, and/or low-calorie. However, it has proven difficult to find a food alternative for flour-based or similar products that meet these criteria. Accordingly, it would be beneficial to have a low-calorie, low-carbohydrate, good source of protein egg food product as an alternative to flour-based or similar products.

SUMMARY

A food product and a method of making a food product are provided herein. The food product comprises at least 80% eggs and may have at most 5% carbohydrates. The food product is processed to create a noodle shaped product that does not taste like eggs, therefore providing a healthy alternative to flour-based noodles. The method of making the food product comprises mixing and pressurizing while heating a liquid composition to gradually and uniformly heat the liquid composition without creating a skin, then cutting the solid composition to a desired length.

In some embodiments, a method of making a food product is provided, the method comprising: feeding a liquid composition into a cavity, the liquid composition comprising at least 80% liquid egg comprising albumen and yolk; mixing the liquid composition in the cavity; raising the temperature of the mixed liquid composition to above 175° F.; and after raising the temperature, extruding the mixed liquid composition through a die cavity having a temperature greater than 175° F. to solidify and shape the mixed liquid composition into a solid composition; and cutting the solid composition to a desired length.

In some embodiments, a food product comprises: a cylindrical body having a diameter of between 0.25 and 0.38 inches, and a length of more than 0.5 inches, wherein approximately 90 weight % or more of a composition of the cylindrical body is egg.

In some embodiments, a method of making a food product comprises: inserting a mixture comprising at most approximately 5 weight % carbohydrates into a conduit; heating the conduit; and removing the food product from the conduit, wherein the food product comprises a shaped body having a length of more than 0.25 inches and a length to a width ratio greater than 1 to 1.

In some embodiments, a food product comprises: a shaped body comprising at least 90% weight % egg, the shaped body having a length of at most 0.5 inches.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The embodiments set forth herein are not to be construed as limiting the scope of the invention in any manner.

DETAILED DESCRIPTION

For the purposes of promoting an understanding of the principles of the disclosure, reference will now be made to the embodiment illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings.

Figure 1:
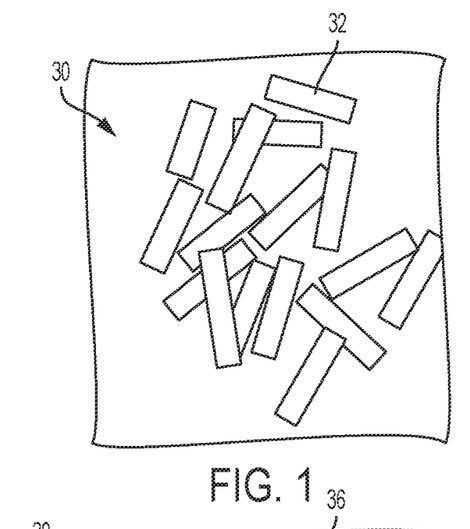
FIG. 1 is a perspective view of an egg food product formed into a cylindrical short solid noodle.
Figure 2:
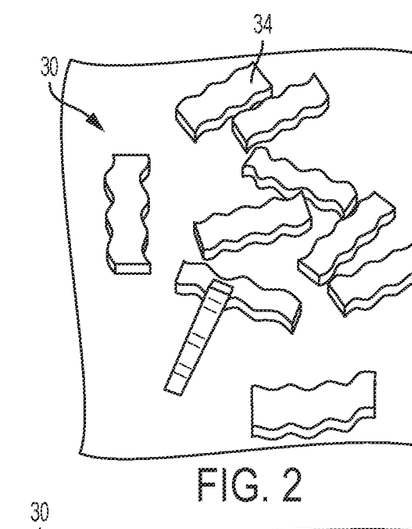
FIG. 2 is a perspective view of an egg food product formed into a crinkled noodle.
Figure 3:
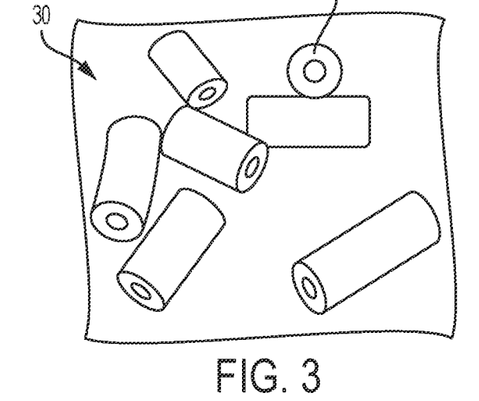
FIG. 3 is a perspective view of an egg food product formed into a tubular short noodle.
Figure 4:
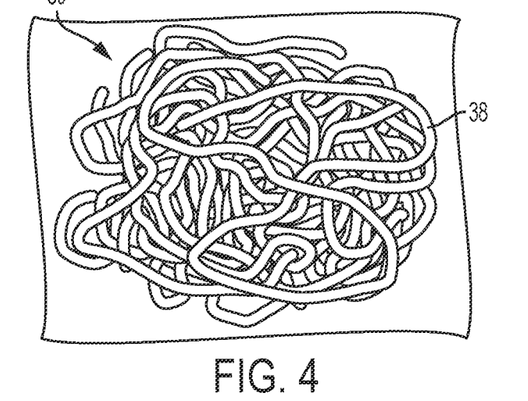
FIG. 4 is a perspective view of an egg food product formed into an elongate noodle.

Referring to FIGS. 1-4, an egg food product 30 and a method for making the same are disclosed herein that are capable of replacing many flour-based and/or flour-containing food products or similar products. Egg food products 30 are a low-calorie, low-carbohydrate, gluten-free, good source of protein food alternative to traditional flour-based or flour-containing products or similar, such as pastas (i.e., spaghetti, fettuccini, ravioli, macaroni, elbow noodles, dumplings, and others), rice, etc. FIG. 1 shows a cylindrical short solid noodle 32. Fig. shows a crinkled noodle 34. FIG. 3 shows a tubular short noodle 36. FIG. 4 shows an elongate noodle. Noodles 32, 34, 36, and 38 where made in accordance with the method described with reference to FIG. 5. By "low calorie," it may be understood that the calories of egg food product 30 may be less than an equivalent serving of a flour-based food product or similar. By "low-carbohydrate," it may be understood that the carbohydrates of egg food product 30 may be less than an equivalent serving of a flour-based food product or similar. For example, egg food products produced according to the present disclosure include up to approximately 5 grams of carbohydrates in a 100 gram serving, and more preferably between approximately 1 to 3 grams of carbohydrates in a 100 gram serving, while flour-based food products, such as macaroni noodles, include approximately 30 or more grams of carbohydrates in a 100 gram serving. In various embodiments, egg food products produced according to the present disclose may include 2 grams of carbohydrates or less in a 100 gram serving.

Egg food product 30 generally comprises an egg product blend or composition comprising egg white solids and water in various ratios from various forms of egg whites, i.e., powdered, liquid, pasteurized, desugared, etc., and/or egg yolk in various amounts and/or forms, i.e., powdered, liquid, pasteurized, desugared, etc., where the blend is formed and/or shaped into the egg food product. In various embodiments, the egg product blend may include liquid and/or dried desugared or non-desugared egg whites, liquid and/or dried whole egg and/or liquid and/or dried yolk, individually or in any combination. For example, the provided amount of egg product blend may consist of blended liquid whole egg with or without added egg white powder and/or liquid egg whites, or a concentrated mixture of egg white solids and water, formed from powdered egg whites and water or liquid egg whites.

According to the American Egg Board, powdered egg whites can generally be produced by spraying atomized liquid egg white into a heated dryer chamber, whereby a continuous flow of accelerated heated air removes most of the moisture from the liquid egg whites. Egg white can also be dried on trays or pans to create a flake or granular form. Flakes and/or larger grains of the egg white may be reduced in size and/or formed into a particular shape (e.g., granular and/or spherical by applying pressure), depending on the application of the egg food product. However, the egg whites may be dried, desugared, or concentrated according to any of the methods known in the industry. In some embodiments, if a yolk is included in the egg food product, the yolk may be omega-end ched, or include other nutritional enhancements either naturally present or specifically added.

In various embodiments, the egg product blend disclosed herein may have a higher concentration of egg white solids and total solids as compared to the egg white solids and total solids present within a traditional shelled egg. In one example, the egg product blend contains approximately between 23-40% total solids, while a traditional shelled egg contains approximately 23% total solids. Additionally, the ratio of the egg white to egg yolk in the egg product blend may be approximately 1:0 to 1.9:1. In various embodiments, the ratio of the egg white to egg yolk in the egg product blend may be approximately 2.3:1 to 1.9:1. For example, the egg product blend may include 50 parts liquid whole egg and 1 part egg white powder or liquid, 60 parts liquid whole egg to 1 part egg white powder or liquid, 70 parts liquid whole egg to 1 part egg white powder or liquid, 80 parts liquid whole egg to 1 part egg white powder or liquid or 90 parts liquid whole egg to 1 part egg white powder or liquid, or any ratio therebetween (i.e., 55 parts liquid whole egg to 1 part egg white powder or liquid or 75 parts liquid whole egg to 1 part egg white powder or liquid).

The egg product blend may also include a binder, stabilizer, enhancer, antifoaming agent, or emulsifier. The binder or stabilizer may be a polysaccharide or a vegetable gum. For example, the binder or stabilizer may be xanthan gum, guar gum, locust bean gum, cellulose gum, agar agar, pectin, or other similar binders or stabilizers. The antifoaming agent may be an oil based defoamer, a powder defoamer, a water based defoamer, a silicone based defoamer, EO/PO based defoamers, or other similar defoamers or anti-foaming agents. In addition, in various embodiments, additional ingredients or additives may be added to the egg product blend to enhance the flavor, texture, and/or appearance of the food product. For instance, various sweeteners, preferably natural sweeteners (e.g., honey), spices (e.g., ginger), cheeses, meats, vegetables, fruits, nuts, seeds, colorants, preservatives (e.g., cellulose, raisin, and polylsine), enhancers (e.g., Noodex™), yeast, fiber (e.g., glucomannan or konjac root), or other various ingredients may be added. However, in order for the food product to be lower-calorie and gluten-free, flour is not an additional ingredient used in the egg food products. Nevertheless, minimal amounts of flour, preferably gluten-free flour (e.g., almond, coconut and tapioca), may be used (i.e., 0%, 2%, 4%, 6%, 8%, or 10%, or any range defined between any two of the foregoing values, for example 0-2%).

To form egg food product 30, an amount of egg product blend is provided and agitated, homogenized, or otherwise mixed or stirred for a length of time. Concurrently and/or subsequently, heat is applied to the egg product blend, and egg food product 30 of a desired thickness and/or shape is formed by way of extrusion, molding, etc. from an amount of the egg product blend. For example, the egg product blend is processed in an extrusion apparatus 70, described below with reference to FIG. 1.

Heat is applied to the egg product blend such that the finished egg food product is cooked. For instance, the cooking conditions may include heating the egg product blend or mixture as it is passed through an extruder, or heating the egg product blend or mixture once it has been poured into a mold. In various embodiments, the cooking conditions may also include applying heat prior to either the egg product blend passing through the extruder or the egg product blend being poured into the mold. Generally, a majority of the heat is applied to the egg product blend before or during the egg product blend being shaped. Heat may be transferred to the egg product via various methods such as by way of conduction (i.e., hot water baths, steam baths, etc.) or radiation (i.e., microwave technology, etc.), for example. In various embodiments, heat may be transferred to the egg product via one or more of the various methods. The egg product blend is generally heated at a temperature between 100-215° F. for approximately 5 seconds to 5 minutes. For instance, an exemplary sample was generally cooked at approximately 185° F. for approximately 2 minutes. In various embodiments, the egg product blend or mixture may be preheated to approximately 100-115° F. before being cooked. By preheating the liquid blend or mixture, the cook times may be shortened. For instance, in the exemplary sample, by preheating the egg product blend or mixture to approximately 110° F., the cooking time at 185° F. is approximately 1 minute. In various embodiments, the formed blend may have heat applied to all surfaces, and a quick-release or non-stick product may be used during the cooking step for better or easier removal of the food product. In various embodiments, the cooked egg product may be cooled prior to being further formed or shaped. For example, when the egg product is shaped by extrusion or the use of a mold or similar methods, the cooked egg product may be cooled prior to cutting or further shaping the cooked egg product after removal from the mold.

Figure 5:
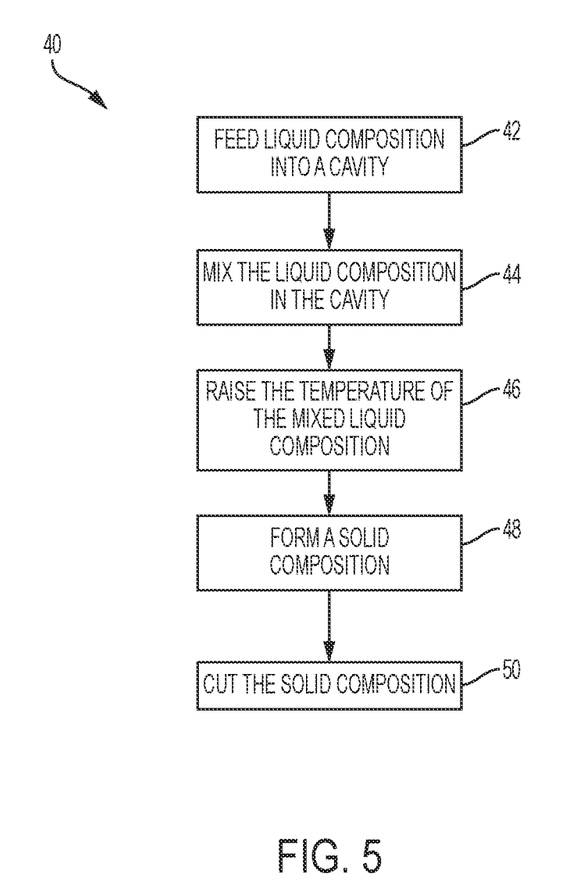
FIG. 5 is a flowchart of a method of manufacturing the noodles shown in FIGS. 1-4.
Figure 6:
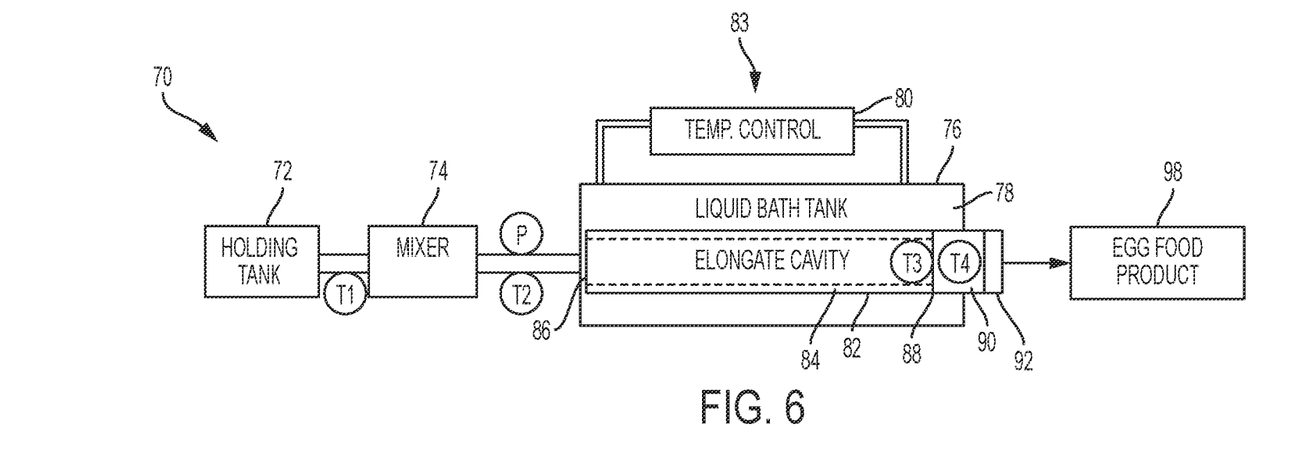
FIGS. 6-8 are block diagrams of embodiments of equipment used to implement the method described with reference to FIG. 5.
Figure 7:
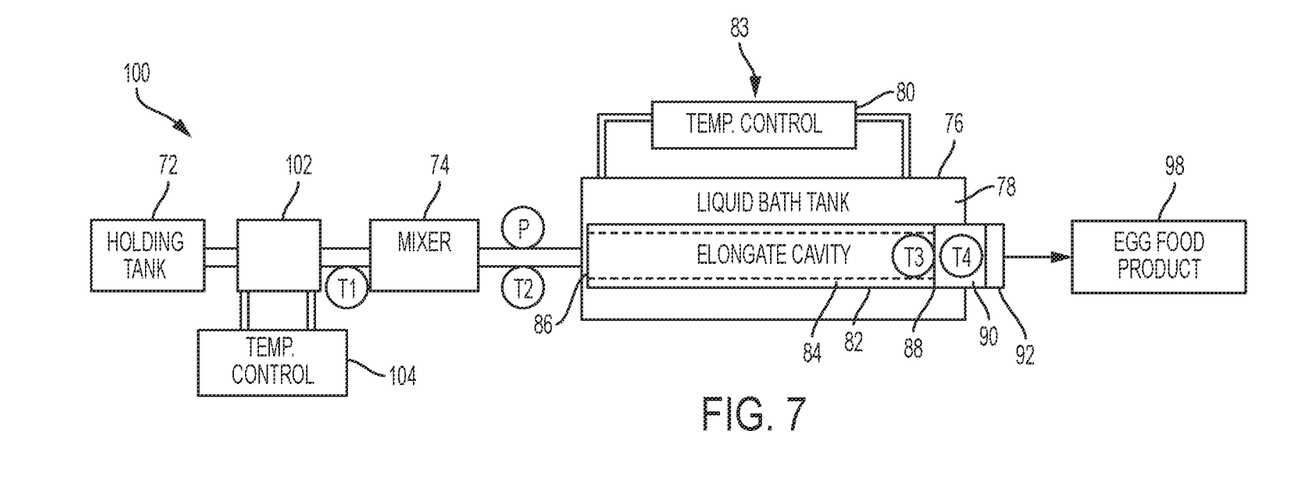
Figure 8:
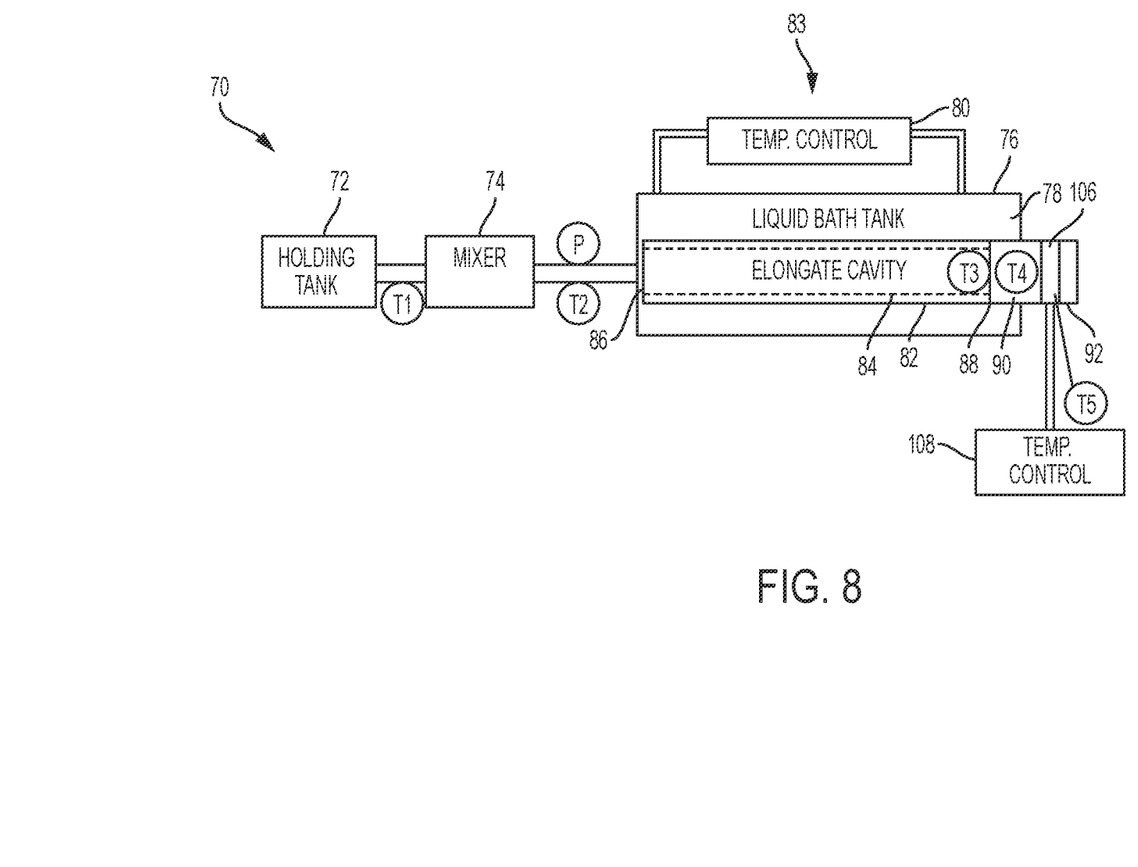

FIG. 5 is a flowchart 40 of a method of manufacturing substantially flourless egg noodles, or egg noodles, and more specifically the noodles shown in FIGS. 1-4. FIGS. 6-8 are block diagrams of embodiments of equipment used to implement the method described with reference to FIG. 5. Returning to FIG. 5, the method begins, at 42, by feeding a liquid composition or egg product blend into a cavity. In one embodiment, the egg noodle liquid composition comprises liquid egg. Prior to feeding the liquid composition into the cavity the liquid composition may be maintained at a temperature low enough to inhibit bacterial growth. In one example, the liquid composition is maintained at a temperature below 50° F., and more preferably below 45° F., prior to feeding the liquid composition into the cavity.

The method continues, at 44, with mixing the liquid composition in the cavity. A mixer or a homogenizer contains the cavity. The mixer or homogenizer may pressurize the liquid composition. The mixer/homogenizer may include a single-piston or multi-piston pump integral or downstream of the mixer/homogenizer to pressurize the liquid composition as it is mixed/homogenized and discharge it at a substantially constant pressure. In various embodiments, the pressure within the mixer or homogenizer is approximately 900-1100 psi.

The method continues, at 46, with raising the temperature of the mixed liquid composition. The liquid composition is discharged from the cavity due to the pressure generated by the mixer/homogenizer. The pressure controls the flow rate of the liquid composition and therefore the production rate. The pressure is dependent on diameters of equipment components downstream of the mixer/homogenizer. The temperature of the liquid composition is raised gradually and preferably under turbulent flow conditions to heat the liquid composition in a uniform manner without creating a skin in areas where the liquid composition contacts the equipment.

The method continues, at 48, with forming a solid composition. By forming it is meant that the liquid composition is permitted to transition from a liquid to a solid state. In an extrusion process, the point in time at which solidification occurs is controlled to prevent premature plugging of the equipment. By plugging it is meant that the pressure required to maintain flow of the liquid composition exceeds the capacity of the pressure source to provide it. The distance between where the state transition occurs and where the solid egg noodle is discharged is therefore relatively short and may be comprised in a die, for example a multi-cavity die. Solidification may result from the application of heat. Omission of heat removal may cook the liquid composition from within with heat already present in the liquid composition.

The method continues, at 50, with cutting the solid composition. Cutting is performed as the extrusion process discharges a continuous string or strings of egg food product. The speed of the cutting element determines the length of the egg noodle. In another embodiment, after step 48 the liquid composition is discharged into molds where egg noodles are formed.

Referring to FIG. 6, a block diagram of an embodiment of equipment 70 configured to produce the egg noodles is shown. Equipment 70 includes a holding tank 72 in which eggs and, optionally, water and additives, are placed and maintained at a temperature at or below T1. Generally, T1 is a temperature sufficiently low to inhibit bacterial growth. In one example, T1 equals less than 45° F. From holding tank 72 the liquid composition is fed into a cavity of a mixer 74, where the liquid composition is mixed. In one variation of the present embodiment, mixer 72 comprises a three-piston homogenizer capable of discharging a mixed composition at a pressure equal to or in excess of P, while in another variation of the present embodiment, mixer 72 comprises a single-stage homogenizer capable of discharging the mixed composition at a pressure equal to or in excess of P. P may be between about 900-1,400 psi, more preferably between 1,000-1,200 psi, and even more preferably between 1,050-1,1150 psi. The mixer has a discharge port. Pressure P is selected based on the diameter of downstream equipment components and other parameters that determine the solidification point of the liquid composition.

The mixed liquid composition is then heated and formed in an apparatus 83 comprising a heating apparatus 82, a liquid bath tank 76, and a temperature controller 80. From the discharge port the mixed liquid composition enters heating apparatus 82 having an elongate cavity 84 which includes an inlet port 86 and an outlet port 88. Temperature sensors measure temperatures T2 and T3 corresponding to the temperatures of the composition entering and exiting elongate cavity 84. In this embodiment, T1 and T2 are generally substantially similar. While in elongate cavity 84, the temperature of the mixed liquid composition is raised from T2 to T3, and then from T3 to T4. T3 may be selected to be as high as possible but less than a temperature at which the mixed liquid composition solidifies at a given throughput rate. T3 may depend on various factors including throughput rate and additives. In one example, T3 equals between 165-180° F., preferably between 170-175° F., and even more preferably 172-174° F. Heating apparatus 82 is at least partially submerged in a liquid 78 held by liquid bath tank 76. Temperature controller 80, such as a thermolator, circulates liquid 78 through temperature controller 80 to heat it. A thermolator comprises a heat exchanger where the temperature of a working fluid is controlled about a setpoint and used to indirectly heat liquid 78.

From the outlet, the heated mixed liquid composition enters a die 90 in which the egg noodle is extruded by application of heat and pressure into a solid composition. The heat is applied to cook the composition at a temperature equal to or exceeding T4. In one example, T4 equals between 180-215° F. After extrusion, the solid composition is cut into desired lengths to become egg noodles 30. As the noodles or product 30 exit the apparatus, the temperature of the product is between approximately 130 and 170 degrees, and more preferably between 140 and 160 degrees. As discussed with reference to FIGS. 14 and 15, a manifold may be positioned downstream or upstream of apparatus 82 to increase throughput. If the manifold is positioned downstream, a multi-cavity apparatus 82 may be used, an example of which is described with reference to FIGS. 10 and 11.

Referring now to FIG. 7, a block diagram of an embodiment of equipment 100 configured to produce the egg noodles is shown. Equipment 100 comprises equipment 70 and includes, additionally, a liquid bath tank 102, which is similar in function as liquid bath tank 76, and a temperature controller 104. Liquid bath tank 102 and temperature controller 104 are operable to heat the liquid composition flowing from holding tank 72 to mixer 74 to raise the temperature of the liquid composition up to temperature T1. Raising the temperature may improve mixing and/or homogenizing and reduces the thermal load on temperature controller 80.

As discussed above, heating apparatus 82 is operable to raise the temperature of the mixed liquid composition from T2 to T3. In some embodiments, heating apparatus 82 comprises a Teflon-coated braided coil or conduit, or a plurality of them, and elongate cavity 84 is the internal volume of the coil. Teflon coating the surfaces that form the internal volume of the coil enables flow of the liquid composition at high pressure without sticking of the liquid composition to the coil's surface. Die 90 may comprise a distal end portion of the coil at which the liquid composition solidifies. Cutter 92 may comprise a rotating element whose rotating speed determines the length of the egg noodles. Examples of rotating elements include blades and wires. The distal end portion is relatively short, in the order of 0.5-5.0 inches. The internal diameter of the coil may be 0.375 inches or substantially the diameter of the noodle, which may range from approximately 0.125 inches to approximately 0.5 inches.

In one example of the present variation of the present embodiment, the working length of the coil is between about 60 and 90 feet, more preferably between 70 and 80 feet, and even more preferably 75 feet. The working length is the length of the axis of the cavity, which is significantly longer than the length of the coil measured end-to-end and corresponds to the distance a portion of the composition travels within the coil. The pumping pressure and flow rate of mixer 74 is adjusted to enable enough dwell time for the mixed liquid composition to reach temperature T4. In this example the internal diameter of the coil is between about 0.125 inches to 0.5 inches, and the pressure P is greater than 900 psi, preferably greater than 1,000 psi, and even more preferably equal to or greater than 1,100 psi. In this example the egg product blend contains between 13-35% egg white solids and between 23-40% total solids, and the ratio of the egg white to egg yolk is about 1.7:1 to 2.1:1. In a variation of the present example, a manifold is positioned between the mixer and the heating apparatus and at least five coils are heated in the liquid bath tank to simultaneously produce at least five egg noodles.

In another example of the present embodiments, the working length of the coil or conduit is between about 100 and 150 feet, more preferably between 115 and 135 feet, and even more preferably 125 feet. The working length is the length of the axis of the cavity, which corresponds to the distance a portion of the composition travels within the conduit. The pumping pressure and flow rate of mixer 74 is adjusted to enable enough dwell time for the mixed liquid composition to reach temperature T4. In this example the internal diameter of the conduit is approximately 0.125 inches, and the pressure P is between approximately 600 and 1400 psi. In this example the egg product blend contains between 24-30% total solids, and the ratio of the egg white to egg yolk is about 1.9:1 to 2.0:1. The above egg product blend and system characteristics provide an egg food product similar to spaghetti noodles.

In yet another example of the present embodiments, the working length of the coil or conduit is between about 60 and 90 feet, more preferably between 70 and 80 feet, and even more preferably 75 feet. The pumping pressure and flow rate of mixer 74 is adjusted to enable enough dwell time for the mixed liquid composition to reach temperature T4. In this example the internal diameter of the conduit is approximately 0.25 inches, the pressure P is between approximately 100 and 300 psi, and the speed of the mixer is approximately 13-16 Hz. In this example the egg product blend contains between 24-29% total solids, and the ratio of the egg white to egg yolk is between approximately 1.9:1 to 2.0:1, and more preferably approximately 1.95:1 and 1.99:1. The above egg product blend and system characteristics provide an egg food product similar to macaroni noodles.

In still another example of the present embodiments, the working length of the coil or conduit is between about 60 and 90 feet, more preferably between 70 and 80 feet, and even more preferably 75 feet. The pumping pressure and flow rate of mixer 74 is adjusted to enable enough dwell time for the mixed liquid composition to reach temperature T4. In this example the internal diameter of the conduit is approximately 0.25 inches, the pressure P is between approximately 2,000 and 2,600 psi, and the speed of the mixer is approximately 14 Hz. In this example the egg product blend contains between 34-36% total solids (including ginger), and the ratio of the egg white to egg yolk is about 2.1:1 to 2.3:1. The above egg product blend and system characteristics provide an egg food product similar to an Asian-inspired thick noodles.

In yet another example of the present embodiments, the working length of the coil or conduit is between about 100 and 150 feet, more preferably between 115 and 135 feet, and even more preferably 125 feet. The pumping pressure and flow rate of mixer 74 is adjusted to enable enough dwell time for the mixed liquid composition to reach temperature T4. In this example the internal diameter of the conduit is approximately 0.125 inches, the pressure P is between approximately 1,000 and 2,000 psi, and the speed of the mixer is approximately 18 Hz. In this example the egg product blend contains between 28-31% total solids (including ginger), and the ratio of the egg white to egg yolk is about 1.9:1 to 2.1:1, and more preferably approximately 2:1. The above egg product blend and system characteristics provide an egg food product similar to Asian-inspired spaghetti noodles.

In still another example of the present embodiments, the working length of the coil or conduit is between about 100 and 150 feet, more preferably between 115 and 135 feet, and even more preferably 125 feet. The pumping pressure and flow rate of mixer 74 is adjusted to enable enough dwell time for the mixed liquid composition to reach temperature T4. In this example the internal diameter of the conduit is approximately 0.1875 inches, the pressure P is between approximately 800 and 1,200 psi, and the speed of the mixer is approximately 15 Hz. In this example the egg product blend contains between 24-26% total solids (including approximately 0.3-0.7% xanthan gum), and the ratio of the egg white to egg yolk is about 1.9:1 to 2.1:1, and more preferably approximately 1.94:1. The above egg product blend and system characteristics provide an egg food product similar to macaroni noodles.

Product properties and system properties of the egg food products listed above and other various egg food products formed according to the embodiments of the present disclosure are provided below in Tables 1-4. In general, the egg product blends and cooked egg products comprise at least 80%, by weight or volume, of egg, more preferably at least 90%, by weight or volume, of egg, and even more preferably at least 95%, by weight or volume, of egg. In addition, solids of the egg product blends formed into the egg food products range between 1:0 to 1.9412:1, density of the egg product blends are between approximately 0.50 and 1.02, solids of the cooked egg products range between 25-32%, the temperature of the cooked egg products immediately after exiting the apparatus is between approximately 134 and 170 degrees Fahrenheit, the temperature of the cooked egg products after being allowed to cool is between approximately 38 and 59 degrees Fahrenheit, the temperature of the liquid bath is between approximately 203 and 213 degrees Fahrenheit, the mixer speed is between approximately 8 and 28 Hertz, the mixer amps is between 6.8 and 7.1, the compression measurement in grams of force for the cooked egg product is between approximately 28 and 12,286, and the tension measurement in grams of force for the cooked egg product is between approximately 9 and 60. The measurements of the cooked egg product were taken immediately after the cooked product exited the apparatus or once the cooked egg product had cooled, but prior to any further cooling or freezing.

TABLE 1

Examples

| Parameters | Units | Spaghetti | Macaroni | Asian-Inspired Thick Noodle | Asian-Inspired Spaghetti |
|---|---|---|---|---|---|
| % additive | % | — | — | N/A | N/A |
| Whole egg solids | % | 25.11-25.89 | 25.377 | 25 | 25.89 |
| Ratio (EW:Y) | Ratio | 1.941:1-2:1 | 1.973-1.983:1 | 2.18:1-2.27:1 | 2:01 |
| Mixture solids | % | 25.36-27.02 | 26.05-26.387 | 35.31 (w/ginger) | 29.94 (w/ginger) |
| Density of mixture | | 0.83-1.02 | N/A | N/A | 0.76 |
| Pressure | PSI | 600-1400 | 100-300 | 2000-2600 | 1000-2000 |
| Hose Length | Feet | 125 | 75 | 75 | 125 |
| Diameter | Inches | 0.125 | 0.25 | 0.125 | 0.125 |
| Solids of Cooked Product | % | 28.02 | N/A | N/A | 31.5 |
| Temp. of Cooked Product | °F. | N/A | N/A | N/A | 136 |
| Temp. of Cooled Product | °F. | N/A | N/A | N/A | 53.2 |
| Water Bath Temp. | °F. | 204.6-212.5 | 209.4-211.2 | 210.6 | 204.2 |
| Mixer Speed | Hertz | 15-16 | 14 | 14 | 18 |
| Mixer Amps | Amps | 5.3-6.9 | 5.1-5.2 | 5.7 | 7 |
| Compression of Product | Grams of Force | 28-5,113 | N/A | 4,505-5,155 | 3,285-3,695 |
| Tension of Product | Grams of Force | 9-40 | N/A | 30-60 | 11-17 |

TABLE 2

Examples (cont.)

| Parameters | Units | Xathan Macaroni | Guar Gum Macaroni | Whey Macaroni | Nisin + 0.5% Xanthan Gum |
|---|---|---|---|---|---|
| % additive | % | 0.3-0.7 | 0.1-0.6 | 1.25 | 0.005-0.02 |
| Whole egg solids | % | 24.1-24.4 | 24.04-24.55 | 24.79 | 24.24-24.87 |
| Ratio (EW:Y) | Ratio | 1.9412:1 | 1.9412:1 | 1.9412:1 | 1.9412:1 |
| Mixture solids | % | 24.71-25.44 | 24.0-26.6 | 25.14 | 24.67-25.26 |
| Density of mixture | | 0.6-0.8 | 0.90-0.93 | 0.93 | 0.5-0.72 |
| Pressure | PSI | 800-1200 | 200-800 | 600 | 800-1200 |
| Hose Length | Feet | 125 | 125 | 125 | 125 |
| Diameter | Inches | 0.1875 | 0.1875 | 0.1875 | 0.1875 |
| Solids of Cooked Product | % | 26.29-27.04 | 25.3-26.6 | 27.72 | 26.15-26.68 |
| Temp. of Cooked Product | °F. | 149-159 | 147-162 | 134.2 | 150.3-157 |
| Temp. of Cooled Product | °F. | 42.8-51.0 | 44.1-56.8 | 58.2 | 48.3-50.6 |
| Water Bath Temp. | °F. | 205.7-206.4 | 204.6-206.7 | 206 | 205.3-206.7 |
| Mixer Speed | Hertz | 15 | 15-24 | 16 | 15 |
| Mixer Amps | Amps | 6.9-7.0 | 6.9-7.0 | 7 | 6.9-7.1 |
| Compression of Product | Grams of Force | 5,305-7,035 | 4,595-7,695 | 9,120-9,440 | 4,685-6,245 |
| Tension of Product | Grams of Force | 20-39 | 29-51 | 22-33 | 24-48 |

TABLE 3

Examples (cont.)

| Parameters | Units | Noodex™ | Polylysine + 0.5% Xanthan Gum | Cellulose Macaroni | Konjac Root Macaroni |
|---|---|---|---|---|---|
| % additive | % | 0.1, 0.4, 0.5% | 0.001-0.05 | 0.1-0.5 | 0.05-0.7 |
| Whole egg solids | % | 24.61 | 24.07-24.52 | 24.65-24.78 | 24.65-24.93 |

TABLE 3-continued

Examples (cont.)

| Parameters | Units | Noodex ™ | Polylysine + 0.5% Xanthan Gum | Cellulose Macaroni | Konjac Root Macaroni |
|---|---|---|---|---|---|
| Ratio (EW:Y) | Ratio | 1.9412:1 | 1.9412:1 | 1.9412:1 | 1.9412:1 |
| Mixture solids | % | 25.17-25.35 | 24.72-25.15 | 24.82-26.07 | 24.58-25.02 |
| Density of mixture | | 0.9-0.93 | 0.66-0.91 | 0.8-0.97 | 0.9-1 |
| Pressure | PSI | 600-800 | 800-900 | 600-1000 | 400-800 |
| Hose Length | Feet | 125 | 125 | 125 | 125 |
| Diameter | Inches | 0.1875 | 0.1875 | 0.1875 | 0.1875 |
| Solids of Cooked Product | % | 26.59-26.94 | 26.04-27.49 | 26.04-26.94 | 25.28-26.43 |
| Temp. of Cooked Product | ° F. | 148-152 | 146-155.3 | 142-157 | 148.3-158.6 |
| Temp. of Cooled Product | ° F. | 49.2-53.3 | 53.1-54.8 | 49.1-52.3 | 49.2-53.6 |
| Water Bath Temp. | ° F. | 205.3-206.6 | 204.8-206.6 | 203.1-206 | 203.9-206.4 |
| Mixer Speed | Hertz | 14-22 | 15 | 22-28 | 24-26 |
| Mixer Amps | Amps | 6.9-7.1 | 6.9-7.1 | 6.8-6.9 | 6.8-6.9 |
| Compression of Product | Grams of Force | 4,313-9,947 | 4,026-5,210 | 4,332-7,548 | 4,324-8,731 |
| Tension of Product | Grams of Force | 17-47 | 29-44 | 11-42 | 19-51 |

TABLE 4

Examples (cont.)

| Parameters | Units | Macaroni with Egg Whites | Macaroni w/ Coconut Flour | Egg White Spaghetti | Spaghetti with Xanthan Gum |
|---|---|---|---|---|---|
| % additive | % | — | 1.5 | — | 0.5 |
| Whole egg solids | % | 25.16 | 25.89 | 11.63 (whites only) | 25.89 |
| Ratio (EW:Y) | Ratio | 1.983:1 | 1.9412:1 | 1:00 | 1.9412:1 |
| Mixture solids | % | 25.94 | 26.21 | 11.63 | 25.88 |
| Density of mixture | | 1.02 | 1 | 1 | 0.83 |
| Pressure | PSI | 100-300 | 600 | 600 | 1400 |
| Hose Length | Feet | 125 | 125 | 125 | 125 |
| Diameter | Inches | 0.1875 | 0.1875 | 0.125 | 0.125 |
| Solids of Cooked Product | % | N/A | 28.49 | N/A | 28.02 |
| Temp. of Cooked Product | ° F. | 169.7 | 151.3 | 136.3 | 144.9 |
| Temp. of Cooled Product | ° F. | N/A | 38 | N/A | 55.2 |
| Water Bath Temp. | ° F. | N/A | 204.6 | 204 | 204.6 |
| Mixer Speed | Hertz | 16 | 8 | 20 | 15 |
| Mixer Amps | Amps | 5.2 | 7.3 | 6.9 | 6.9 |
| Compression of Product | Grams of Force | 4,845-6,756 | 9,169-12,286 | N/A | 4,885-5,813 |
| Tension of Product | Grams of Force | 36-52 | 18-36 | N/A | 9-20 |

In some embodiments, equipment 70, 100 comprises a cooling section 106 between heating apparatus 82 and cutter 92, shown in FIG. 8. A temperature controller 108 similar to temperature controllers 80 and 104 may be used to reduce a temperature of the solid composition to temperature T5, which is optimized to facilitate cutting of the continuous string of egg noodle discharged from die 90.

Figure 9:
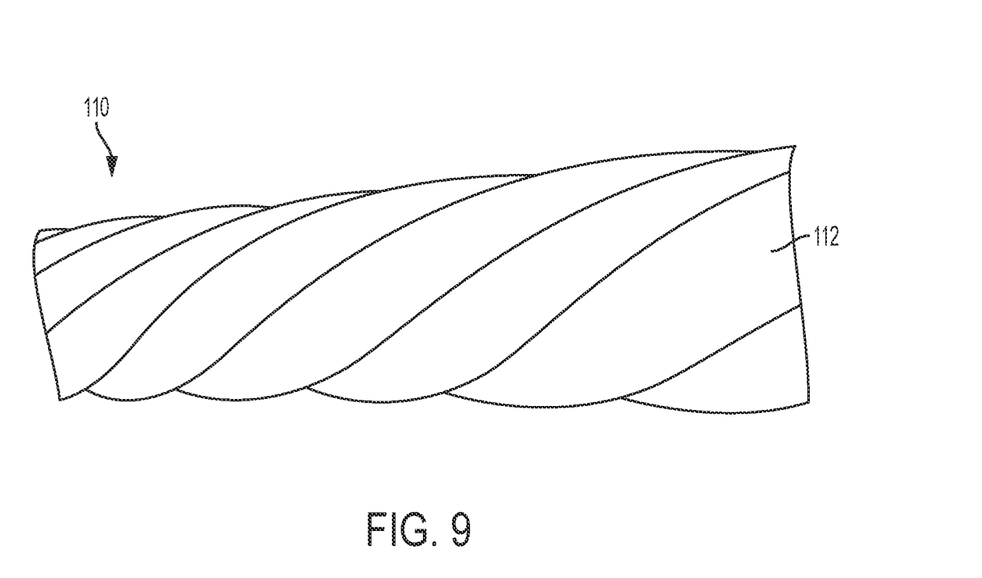
FIG. 9 is a perspective sectional view of an apparatus for heating a liquid composition as described with reference to FIG. 5.

FIGS. 9-13 depict embodiments of heating apparatus 82 denoted by numerals 110, 120, 130, and 160 respectively. Referring to FIG. 9, heating apparatus 110 comprises a plurality of helical protrusions 112 which cause the liquid composition to flow in a turbulent manner to increase mixing and even heat distribution to decrease temperature variation within the composition as it moves through the elongate cavity. In use, heating apparatus 110 is positioned in a liquid bath tank to heat it and thereby heat the liquid composition flowing within it.

Figure 10:
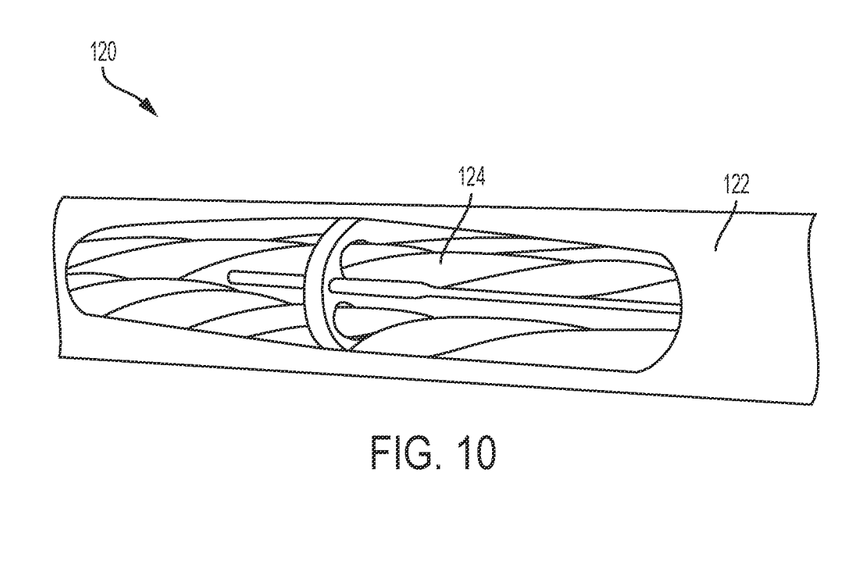
FIGS. 10 and 11 are a side sectional view and an end view of another apparatus for heating a liquid composition as described with reference to FIG. 5.
Figure 11:
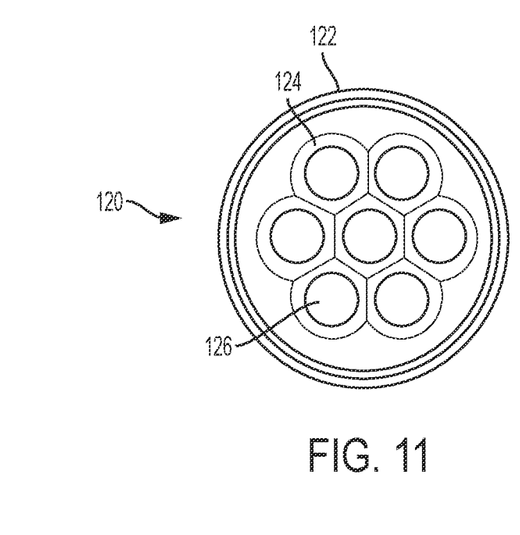

FIGS. 10 and 11 depict side and end views of a heating apparatus 120 comprising a shell 122 and a plurality of tubes 124. Each of the seven tubes 124 comprises an elongate cavity 126. Advantageously, a heating liquid can flow between shell 122 and tubes 124 to provide a compact integrated heating apparatus comprising a tank, e.g. shell 122, and heating apparatus, e.g. tubes 124, and thereby heat the liquid composition flowing within tubes 124. Accordingly, shell 122 functions as a liquid bath tank. Additionally, heating apparatus 120 may also be placed in a liquid bath tank to heat shell 122. More or fewer tubes 124 may be provided.

Figure 12:
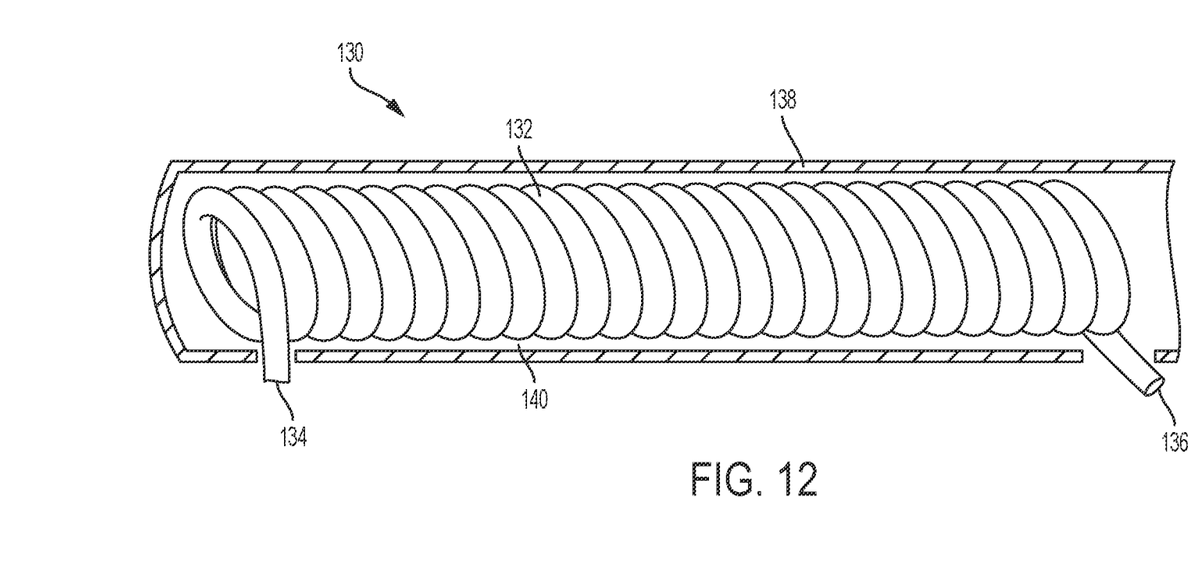
FIG. 12 is a perspective sectional view of yet another apparatus for heating a liquid composition as described with reference to FIG. 5.

FIG. 12 depicts a heating apparatus 130 comprising a shell 138 and a coiled tube 132, or coil, having an inlet port 134 and an outlet port 136. A liquid 140 flows between shell 138 and coil 132. Liquid 140 is heated to heat coil 132 and thereby the composition flowing therein. Additionally, heating apparatus 120 may also be placed in a liquid bath tank to heat shell 138. Multiple tubes 132 may be coiled together.

Figure 13:
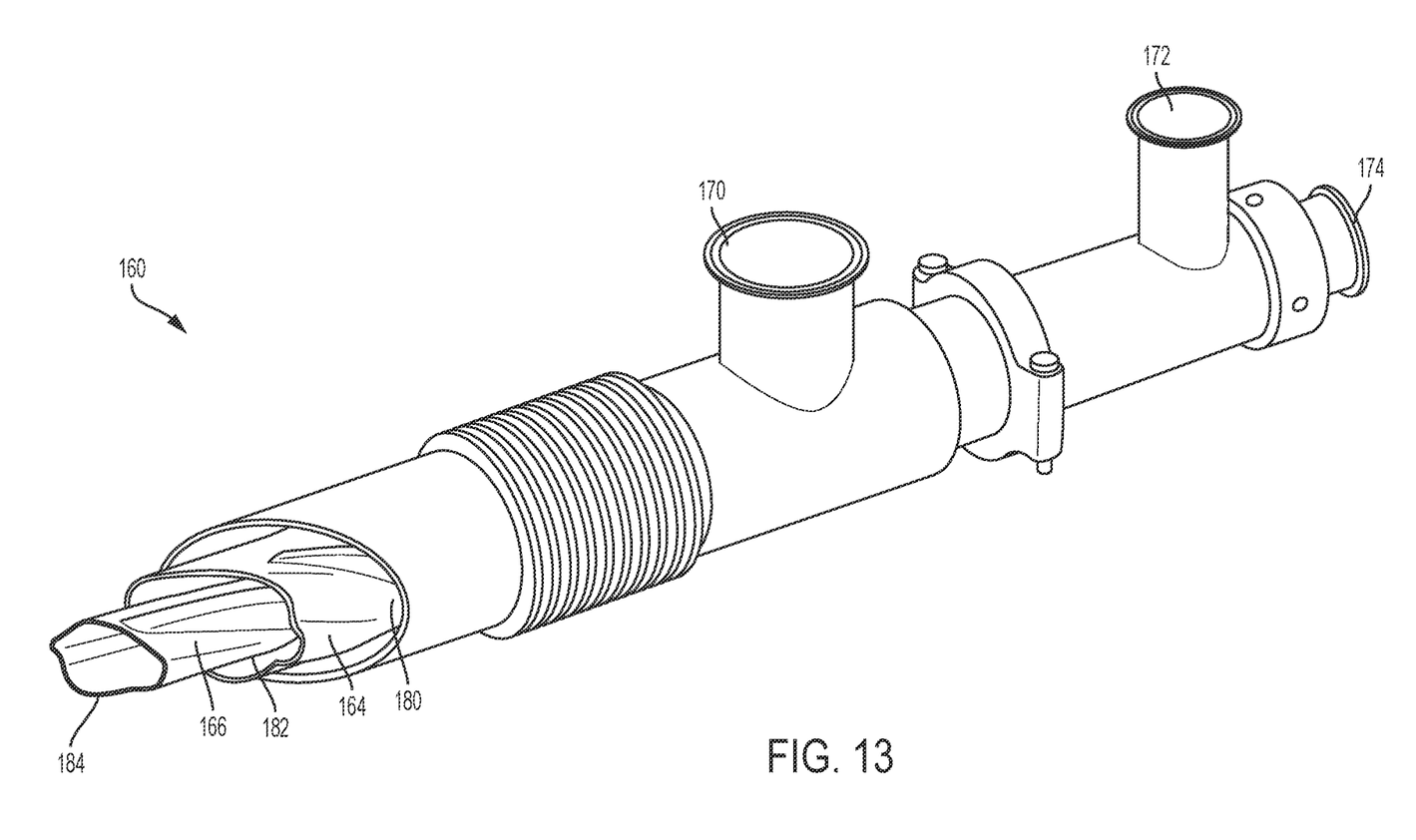
FIG. 13 is a perspective sectional view of a yet further apparatus for heating a liquid composition as described with reference to FIG. 5.

FIG. 13 depicts a heating apparatus 160 comprising inlet ports 170, 172, and 174 of tubes 162, 164, and 166. A volume 180 is present between tubes 162 and 164 to enable flow of heating liquid. A volume 182 is present between tubes 164 and 166 to enable flow of the liquid composition therein. A cavity 184 enables flow of heating liquid therein. Thus, the liquid composition is heated by heating liquids flowing around it externally and internally, increasing heat distribution even more and enabling use of a shorter heating apparatus. Tubes 162, 164, and 166 also comprise outlet ports (not shown). The outlet port of tube 164 is fluidly coupled with die 90. The liquids flowing through volume 180 and cavity 180 may be the same or may be different, and may be controlled by the same or different temperature controllers. The liquid flowing through volume 180 may be referred to as the external heating liquid and the liquid flowing through cavity 184 may be referred to as the second heating liquid.

In some embodiments steam may be used to heat the liquid composition instead of a liquid. For example, steam may pumped through volume 180 and/or cavity 184. Similarly, steam may be pumped inside shells 122 and 138.

In some embodiments shells 122 and 138 are heated with electrical heaters wrapped around them.

Figure 14:
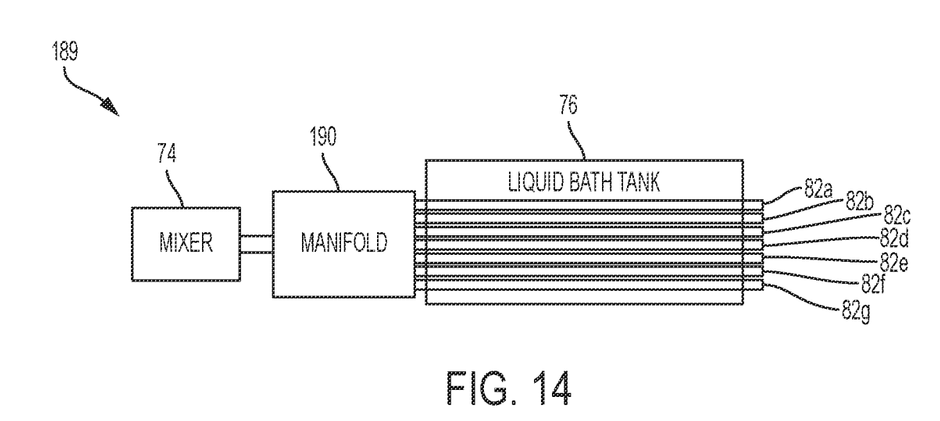
FIGS. 14 and 15 are block diagrams of equipment used to implement the method described with reference to FIG. 5 to illustrate the use of manifolds.
Figure 15:
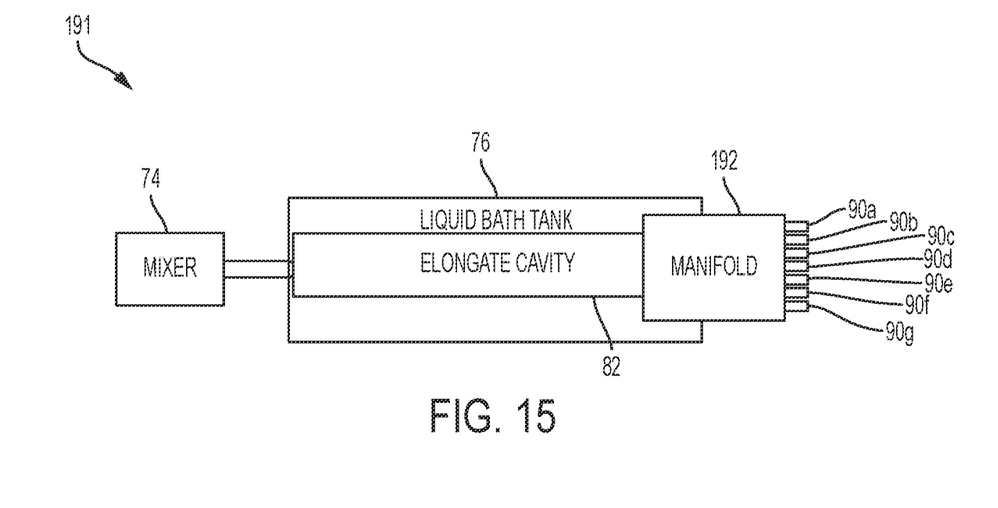

FIGS. 14 and 15 illustrate the use of manifolds to maximize utilization of downstream equipment. When the egg noodles have small diameters, pressure in the heating apparatus can be a throughput limiting factor. A downstream manifold 190, shown in FIG. 14, distributes the liquid composition discharged by the mixer into multiple heating apparatus 82a-82g. The number of heating apparatus may be selected, based on the desired egg noodle diameter, to maximize the mixer's throughput. An upstream manifold 192, shown in FIG. 15, achieves a similar effect by multiplying the number of egg noodles that can be produced from one heating apparatus. Of course, if a heating apparatus as shown in FIGS. 10-11 is used, the multiplying effect is achieved twice by using a downstream manifold between the mixer and the heating apparatus, and an upstream manifold coupled to each tube 124 of heating apparatus 120. The downstream manifold may be incorporated in the mixer. The heating apparatus described in the present embodiment and in any other disclosed embodiment may be coated with a non-stick coating to reduce the internal surface's coefficient of friction and prevent sticking. Teflon is an example of a non-stick coating.

In various embodiments, die 90 of heating apparatus 82 comprises a multi-cavity die or a plurality of dies 90. In one example, heating apparatus 82 includes one elongate cavity 84 fluidly coupled to multiple die cavities, either by way of a multi-cavity die or multiple independent dies. In one example, elongate cavity 84 is comprised by a braided stainless steel hose, and die 90 includes a plurality of hoses fluidly coupled to elongate cavity 84, wherein the plurality of hoses are composed of braided stainless steel or other braided other materials. In another embodiment, elongate cavity 84 and die 90 together include a plurality of braided stainless steel hoses coupled to mixer 74.

In various embodiments, equipment 70 and/or 100 may further include a pressure gauge and/or a shock absorbing device or dampener. In general, the pressure gauge is coupled between mixer 74 and elongate cavity 84, and may be used to increase the pressure of the apparatus to push the egg product blend through elongate cavity 84, die 90 and cutter 92. The shock absorbing device is generally positioned between mixer 74 and the pressure gauge or elongate cavity 84 to help reduce the pulsating of the cooked product while exiting equipment 70 or 100.

In operation, holding tank 72 is filled with water until heating apparatus 82 and pressure throughout the apparatus is properly set. Then, water within tank 72 is flushed from tank 72, and the egg product blend is poured into holding tank 72. From tank 72, the egg product blend passes into mixer 74, where it is mixed or homogenized prior to entering heating apparatus 82. From mixer 74, the egg product blend passes through heating apparatus 82. In general, the egg product blend is passed through heating apparatus 82 by pressure generated by mixer 74. For example, pressure for pushing the egg product through elongate cavity 84 having a 0.25 inch diameter ranges from 100-300 psi, while pressure for pushing the egg product through elongate cavity 84 having a 0.1875 inch diameter ranges from 100-1,200 psi, and pressure for pushing the egg product through elongate cavity 84 having a 0.125 inch diameter ranges from 600-2,600 psi, depending on the composition of the egg product blend. In general, the pressure provided for pushing the egg product through elongate cavity 84 allows the various egg food products to exit the apparatus at a rate of approximately 1 to 5 pounds per minute. From outlet 88 of elongate cavity 84, the heated egg product blend is passed through die 90, where the egg product blend is cooked, and then through cutter 92, where the cooked egg food product is cut into desired lengths and/or shapes.

In various embodiments, the final cooked egg food product 30 may be dried, rinsed, and/or exposed to air to reduce the egg flavor and/or odor or sulfite concentration of the final cooked egg food product. For instance, in one embodiment, the final cooked egg food product may be air dried and/or rinsed with water. In another embodiment, the final cooked egg food product may be blanched for a period of time, blow dried for a period of time, and/or air dried for a period of time. In one exemplary embodiment, the final cooked egg food product is blanched for one minute, blow dried for one minute, and then air dried for one hour. In some embodiments the blend may be filtered to reduce the egg flavor and/or odor or sulfite concentration of the final cooked egg food product. In one example, the blend contains egg whites that have been filtered. The filtered egg whites may be filtered via a filtration system using membrane filtration or other methods of filtration to reduce egg flavor and/or odor prior to being shaped and heated.

The final cooked egg food product may be in the form of a variety of pasta-like shapes, (i.e., thick spaghetti 32 (FIG. 1), a crinkled noodle 34 (FIG. 2), a macaroni noodle 36 (FIG. 3), or thin spaghetti 38 (FIG. 4)), rice, or other flour-based or similar food products. An exemplary egg-containing food product of the present disclosure may have similar properties (e.g., strength, flavor, texture, and/or appearance) as a comparable and traditional flour-based food product or similar products. In this way, a consumer may be encouraged to select the egg-containing food product for health reasons without sacrificing other properties of the traditional flour-based food product or similar products. Thus, it may be desirable to minimize or avoid the flavor, texture, and/or appearance of a traditional cooked egg. The resulting final egg food product may comprise approximately 13-35% by weight solids from the egg whites and/or egg yolk.

The properties of the egg-containing food product may be varied by altering the individual ingredients and their amounts, the forming conditions, and the cooking conditions. For instance, egg flavor and/or odor may be altered, reduced and/or eliminated from the egg product blend as a result of altered concentrations of egg whites and/or egg yolk, altered texture, and/or altered composition. The altered concentrations, textures, and/or compositions may be achieved by means of added ingredients, alternative processes, filtration and/or other means to achieve the desired flavor and/or odor.

Physical Testing Methods

To determine tensile or tear strength, referred to herein as tension, of an egg food product, an egg food product is cut to approximately 5 inches in length. The sample is then placed into a piece of texture analysis equipment (e.g., Texture Technologies Corp.'s TA.Xt Plus tester) by coupling one end of the sample in a top grip clamp of the texture analysis equipment (e.g., TA 96B Miniature Tensile Grip fixture of Texture Technologies TA.Xt Plus tester) and the other end of the sample in a bottom grip clamp of the texture analysis equipment. Ensure that the top and bottom clamps are aligned vertically. Then, the pre-programmed testing procedure is initiated to test the tear/tensile strength of the egg food product. The texture analysis equipment will move the top clamp up while increasing the pulling force. The test is represented by a linear graph representing time (x axis) versus force in grams (y axis). The texture analysis equipment will stop the test when there is an abrupt stop in tension exerted. The maximum value is recorded as a force reading in grams of weight applied. The test is performed three times to obtain an average value.

To determine compression of an egg food product, a 100 gram sample of the egg food product is placed, but not packed tightly, within an acrylic cylinder of a piece of analysis equipment (e.g., Texture Technologies Corp.'s TA.Xt Plus tester) having a wire screen placed at the lower end of the cylinder. A compression probe of the analysis equipment is lowered to near the upper level of the sample. The analysis equipment's extrusion procedure is then initiated. The analysis equipment's extrusion probe will begin to compress the sample. As the sample is compressed, a value of compression in grams of force will be provided. The procedure will end when a decrease in force is detected as the egg food product sample begins to pass through the wire screen. The maximum force recorded during this procedure is recorded by the analysis equipment as the compression force of the product. The test is performed three times to obtain an average value.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of making a food product, the method comprising:
   feeding a liquid composition into a cavity, the liquid composition comprising at least 80 weight % of at least one of egg white or egg yolk;
   mixing the liquid composition in the cavity;
   raising a temperature of the mixed liquid composition to between 165-180° F. while pumping the mixed liquid composition through an elongate cavity having a length to maximum diameter ratio greater than 10; and
   after raising the temperature, extruding the mixed liquid composition through a die cavity by providing a first pressure exceeding a second pressure required to maintain flow of the mixed liquid composition, the die cavity having a temperature between 180-215° F. to solidify and shape the mixed liquid composition into a solid composition; and
   cutting the solid composition to a desired length.

2. The method of claim 1, further comprising a tube comprising the elongate cavity.

3. The method of claim 1, wherein the cavity is comprised by a homogenizer, and wherein mixing comprises homogenizing the mixed liquid composition at a pressure in excess of 900 PSI.

4. The method of claim 3, wherein the homogenizer comprises at least three pistons, and wherein the at least three pistons reciprocate to pump the mixed liquid composition at intervals configured to maintain a pressure variation below 200 PSI.

5. The method of claim 3, wherein the elongate cavity comprises a cylindrical cavity extending from an inlet proximal to the homogenizer and an outlet forming a die, and wherein the cylindrical cavity has a constant diameter less than 0.5 inch and length greater than 100 ft.

6. The method of claim 5, wherein the cylindrical cavity is comprised by a tube, and wherein raising the temperature of the mixed liquid composition to between 165-180° F. comprises maintaining at least a section of the tube at a temperature above 175° F.

7. The method of claim 3, wherein the elongate cavity comprises a cylindrical cavity having an inlet and an outlet, the inlet proximal to the homogenizer and the outlet forming a die, and wherein the cylindrical cavity has a constant diameter less than 0.5 inch and a length between 60 and 90 ft.

8. The method of claim 1, further comprising raising the temperature of the liquid composition from below 50° F. to above 80° F. prior to introducing the liquid composition into the elongate cavity.

9. The method of claim 8, wherein raising the temperature of the liquid composition from below 50° F. to above 80° F. prior to introducing the liquid composition into the cavity comprises pumping the liquid composition through a liquid bath cavity of a liquid bath containing a liquid having a temperature of between 50° F. and 140° F.

10. The method of claim 9, wherein raising the temperature of the liquid composition from below 50° F. to above 80° F. prior to introducing the liquid composition into the cavity comprises pumping the liquid composition through a liquid bath cavity of a liquid bath comprising multiple stages, each of the multiple stages containing liquids maintained at temperatures of between 50° F. and 140° F., a first liquid in a first stage of the multiple stages maintained at a temperature lower than a temperature of a last liquid in a last stage of the multiple stages.

11. The method of claim 1, wherein raising the temperature of the mixed liquid composition to between 165-180° F. comprises pumping the mixed liquid composition at a pressure greater than 900 psi through a plurality of heated tubes longer than 100 feet, each of the heated tubes having an internal diameter less than 0.4 inches and being coated with nonstick material.

12. The method of claim 1, wherein extruding the solid composition through the die cavity comprises pumping the mixed liquid composition from the elongate cavity into a multi-cavity die having multiple die cavities, further comprising maintaining a temperature of the multi-cavity die at a temperature sufficient to convert the mixed liquid composition into the solid composition.

13. The method of claim 1, further comprising adding an additive before or while mixing the liquid composition, wherein the additive comprises at least one of an enhancer, a preservative, a binder, a stabilizer, a fiber and a spice.

14. A food product comprising:
a shaped body having a length of at least 0.5 inches, wherein at most 5 weight % or less of a composition of the shaped body is carbohydrates, and wherein the product is made by the method of claim 1.

15. The food product of claim 14, wherein the length is 1 inch or more.

16. The food product of claim 14, wherein the length is 3 inches or more.

17. The food product of claim 14, comprising a cylindrical body having a diameter of between 0.25 and 0.38 inches.

18. A method of making a food product, the method comprising:
feeding a liquid composition into a cavity, the liquid composition comprising at least 80 weight % of egg white and/or egg yolk;
mixing the liquid composition in the cavity;
raising the temperature of the liquid composition from below 50° F. to above 80° F.;
raising a temperature of the mixed liquid composition to between 165-180° F. while pumping the mixed liquid composition through an elongate cavity having a length to maximum diameter ratio greater than 10; and
after raising the temperature, transferring the mixed liquid composition through a die cavity having a temperature between 180-215° F. to solidify and shape the mixed liquid composition into a solid composition; and
cutting the solid composition to a desired length.

19. The method of claim 18, wherein raising the temperature of the liquid composition from below 50° F. to above 809° F. prior to introducing the liquid composition into the cavity comprises pumping the liquid composition through a liquid bath cavity of a liquid bath containing a liquid having a temperature of between 50° F. and 140° F.

20. The method of claim 18, wherein raising the temperature of the liquid composition from below 50° F. to above 80° F. prior to introducing the liquid composition into the cavity comprises pumping the liquid composition through a liquid bath cavity of a liquid bath comprising multiple stages, each of the multiple stages containing liquids maintained at temperatures of between 50° F. and 140° F., a first liquid in a first stage of the multiple stages maintained at a temperature lower than a temperature of a last liquid in a last stage of the multiple stages.

21. A method of making a food product, the method comprising:
feeding a liquid composition into a cavity, the liquid composition comprising at least 80 weight % of egg white and/or egg yolk;
mixing the liquid composition in the cavity;
raising a temperature of the mixed liquid composition to between 165-180° F. while pumping the mixed liquid composition at a pressure greater than 900 psi through a plurality of heated tubes longer than 100 feet, each of the heated tubes having an internal diameter less than 0.4 inches and being coated with nonstick material; and
after raising the temperature, extruding the mixed liquid composition through a die cavity having a temperature between 180-215° F. to solidify and shape the mixed liquid composition into a solid composition; and
cutting the solid composition to a desired length.

22. A method of making a food product, the method comprising:
feeding a liquid composition into a cavity, the liquid composition comprising at least 80 weight % of egg white and/or egg yolk;
mixing the liquid composition in the cavity;
raising a temperature of the mixed liquid composition to between 165-180° F. while pumping the mixed liquid composition through an elongate cavity having a length to maximum diameter ratio greater than 10; and
after raising the temperature, transferring the mixed liquid composition through a multi-cavity die having multiple die cavities, the multi-cavity die maintaining a temperature sufficient to convert the mixed liquid composition into a solid composition; and
cutting the solid composition to a desired length.

* * * * *